Figure 1:
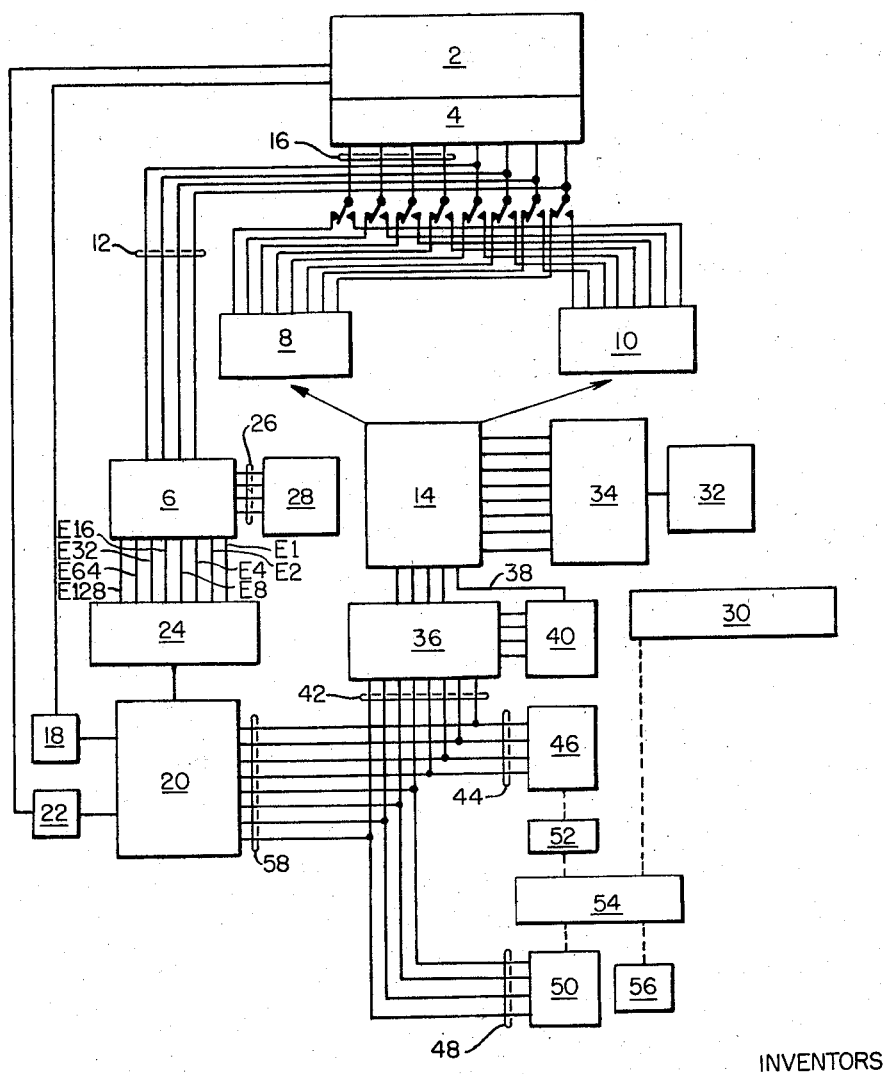

March 10, 1959   R. HIGONNET ET AL   2,876,687
TYPE COMPOSING APPARATUS
Filed June 24, 1952   6 Sheets-Sheet 1

INVENTORS
RENÉ A. HIGONNET
LOUIS M. MOYROUD
BY
ATTORNEYS

March 10, 1959 R. HIGONNET ET AL 2,876,687
TYPE COMPOSING APPARATUS
Filed June 24, 1952 6 Sheets-Sheet 2

INVENTORS
RENÉ A. HIGONNET
LOUIS M. MOYROUD
BY *Kenway Jenney*
*Witter & Hildreth*
ATTORNEYS

INVENTORS
RENÉ A. HIGONNET
LOUIS M. MOYROUD

ATTORNEYS

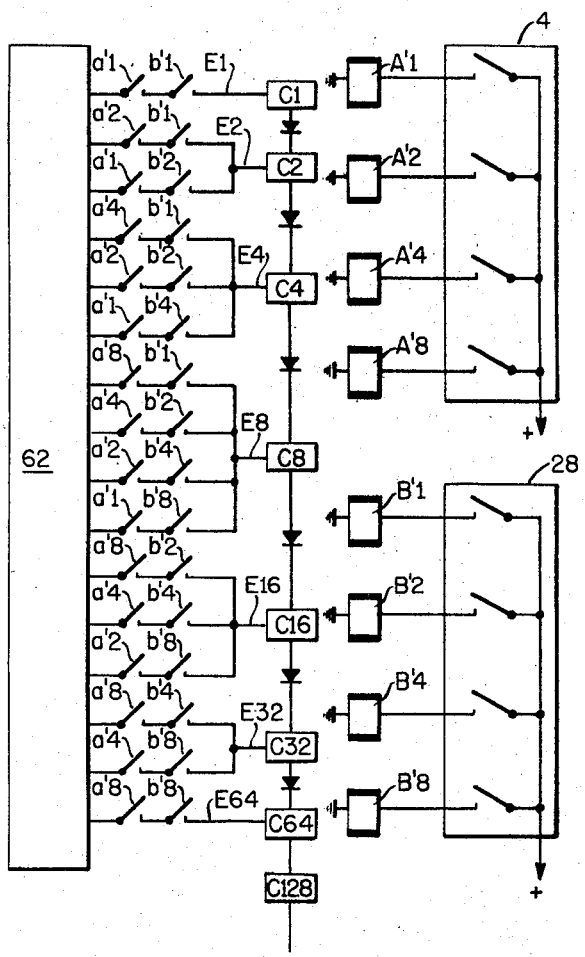

March 10, 1959     R. HIGONNET ET AL     2,876,687
TYPE COMPOSING APPARATUS

Filed June 24, 1952     6 Sheets-Sheet 5

INVENTORS
RENÉ A. HIGONNET
LOUIS M. MOYROUD
BY
ATTORNEY

March 10, 1959 R. HIGONNET ET AL 2,876,687
TYPE COMPOSING APPARATUS
Filed June 24, 1952 6 Sheets-Sheet 6

INVENTORS
RENÉ A. HIGONNET
LOUIS M. MOYROUD
BY
ATTORNEYS

United States Patent Office 2,876,687
Patented Mar. 10, 1959

2,876,687

TYPE COMPOSING APPARATUS

René Higonnet and Louis M. Moyroud, Cambridge, Mass., assignors to Graphic Arts Research Foundation, Inc., Cambridge, Mass., a corporation of Delaware Application June 24, 1952, Serial No. 295,284

Claims priority, application France June 26, 1951

3 Claims. (Cl. 95—4.5)

The present invention relates to type composing machines, and is particularly useful in composing apparatus having justifying means including an accumulator for cumulative addition of selected character and space widths for computation of justification space increments to be subsequently distributed in the composed line. This application is a continuation-in-part of our copending application Serial No. 187,752, filed September 30, 1950, now Patent No. 2,664,986.

The invention may be used in composing apparatus having justifiers of many different types. For example, it may be used with a justifier of the type described in the copending application of Higonnet and Moyroud, Serial No. 70,472, filed January 12, 1949, now Patent No. 2,682,814, wherein the justification increments are always multiples of a common width unit or factor, as well as with justifiers of the type described in our copending application, Serial No. 140,208, filed January 24, 1950, now Patent No. 2,699,859 wherein the increments may be of any value determined by the ratio of the additional space required to justify a line to the number of increments to be distributed therein.

By the term "point size" we shall refer to the dimensions of the characters to be composed. The term "point set," while ordinarily related to point size, refers more particularly to the horizontal space in the line allocable to the character, including a distributive share of the intercharacter space separating it from adjacent characters.

The ordinary requirements of a composing apparatus include means for adjusting the point set according to the selected size and style of type, and also according to the degree to which the type is to be expanded or condensed. It is obvious that the characters of each alphabet, being of different relative dimensions, require different amounts of the available space. It has therefore been recognized that the normal space allocable to a given character may be conveniently represented as the product of two factors, the first being the space required by the character in an arbitrarily selected point set, hereinafter referred to as "relative width value," and the second being a coefficient by which the relative width value of each character in the alphabet is multiplied to produce a product which corresponds to the particular set desired.

In the embodiments of the invention herein disclosed it is assumed that each alphabet has fifteen available "relative width values" to be assigned to the characters. The matter of assigning an appropriate value to a particular character is largely an aesthetic question, reflecting various factors of type design including the style and shape of the characters. Of course, more than one character may be assigned the same relative width value. It will be seen, however, that apparatus having different numbers of selectable relative width values may nevertheless fall within the scope of the invention.

A principal feature of the invention is the combination with keyboard actuated code means for representing numerically the relative width value of each character, of coefficient selector means, and a multiplying device for entry of the product of said relative width value and coefficient into the accumulator.

Another feature is the combination of a register actuated by the code and coefficient selector means independently of said multiplying device, spacing means for displacement of the characters composed successively upon a sheet or film from the information stored in the register, and a second multiplying device actuated by the register for advancing the spacing means.

Another feature is the combination of character spacing means, multiple variable escapements including reduction gearing for advancement of said spacing means, and a multiplying device for representing a product numerically, the digits of said product being distributed among the variable escapements in such manner as to increase the number of available amounts of said advancement.

A principal object of the invention is to provide means whereby the sizes and point sets of the characters in a given line may vary without affecting the justification.

Another object is to provide apparatus adapted to the requirements of photographic composing apparatus, in which, after the storage or registration of a line, the characters are successively projected upon a sensitized surface, and variable spacing means are actuated to cause the relative displacement of the projections.

Another object is to provide apparatus suitable for causing the successive character displacements, in which the number of possible amounts of displacement may be extended beyond the capacity of a single variable escapement, which depends upon the number of selectable stops that may be distributed around its periphery. A description of a variable escapement mechanism suitable for use in accordance with this invention may be found in the copending application of Grea, Higonnet and Moyroud, Serial No. 128,162, filed November 18, 1949, now Patent No. 2,636,588.

Other features of the invention include certain circuits, structural arrangements and modes of operations adapted to satisfy the above objects and other appearing herein. These features are hereinafter more fully described and are particularly defined in the claims.

Figure 2:
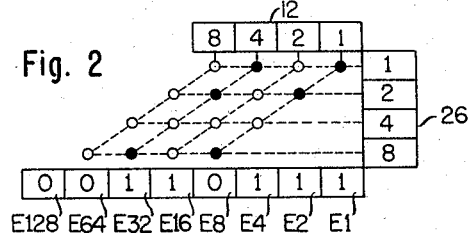
Figure 3:
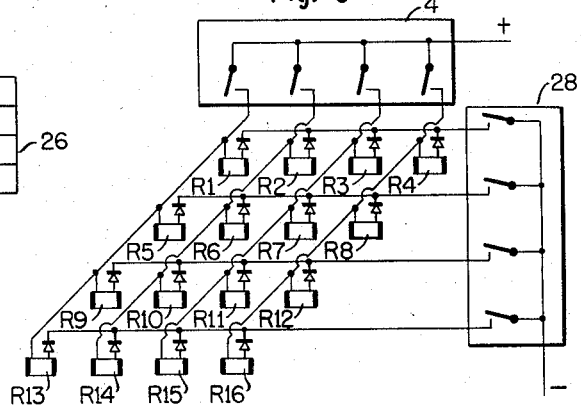
Figure 4:
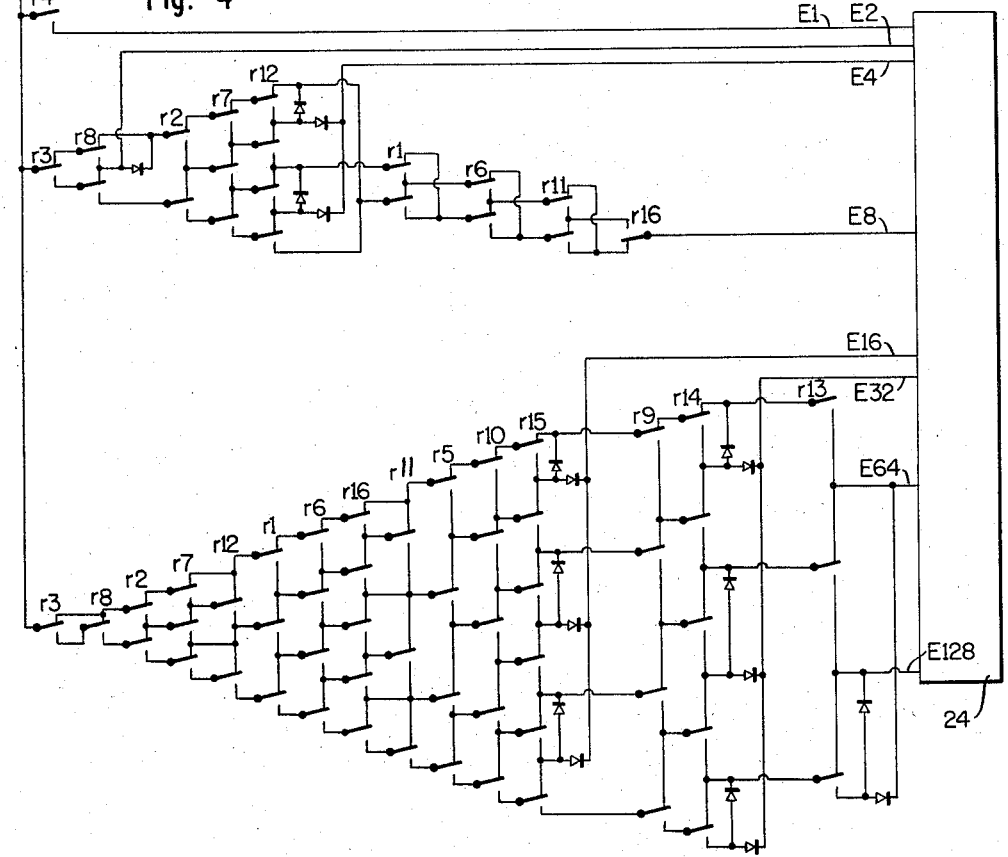
Figure 6:
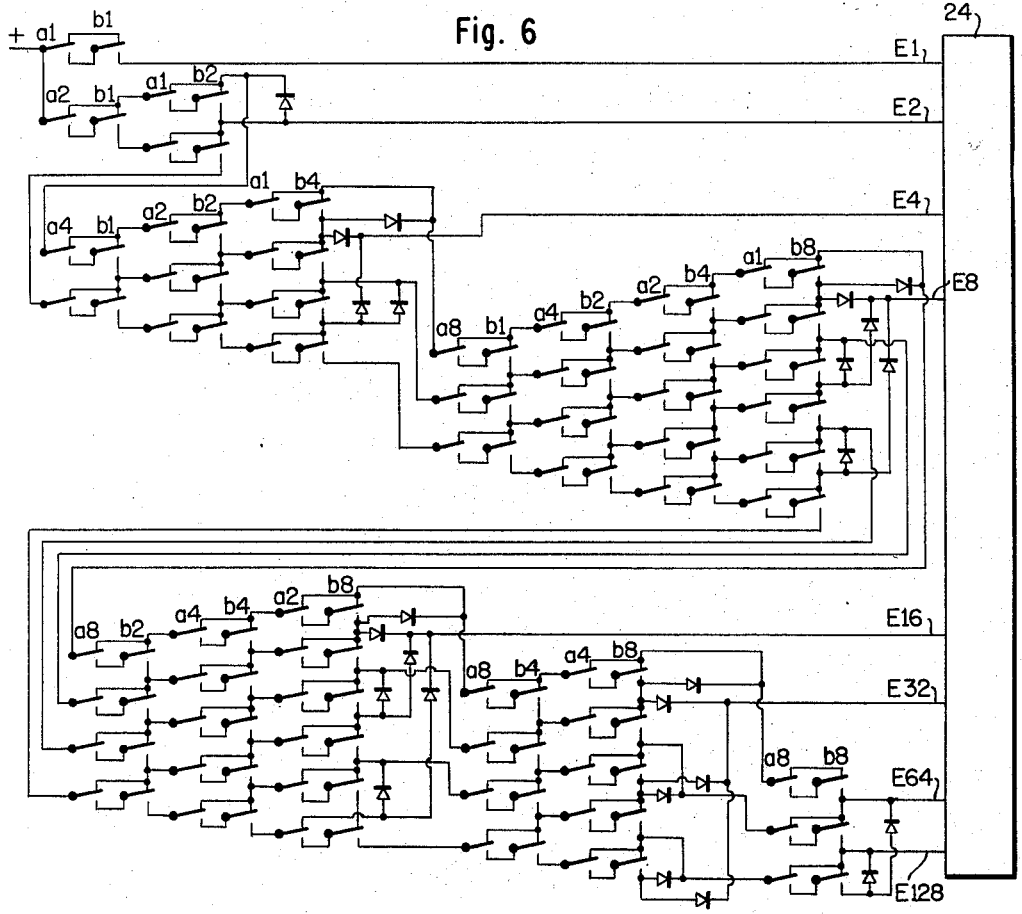
Figure 5:
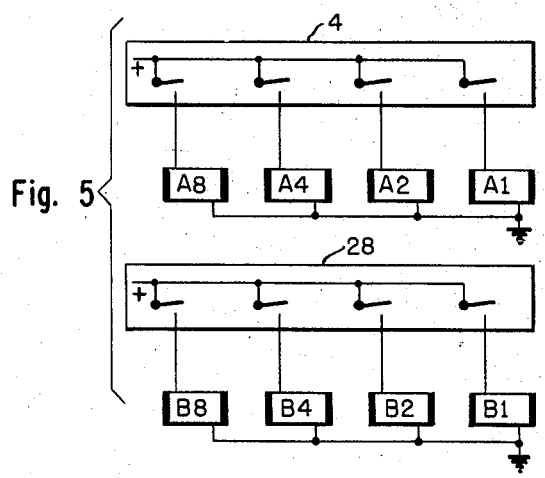
Figure 8:
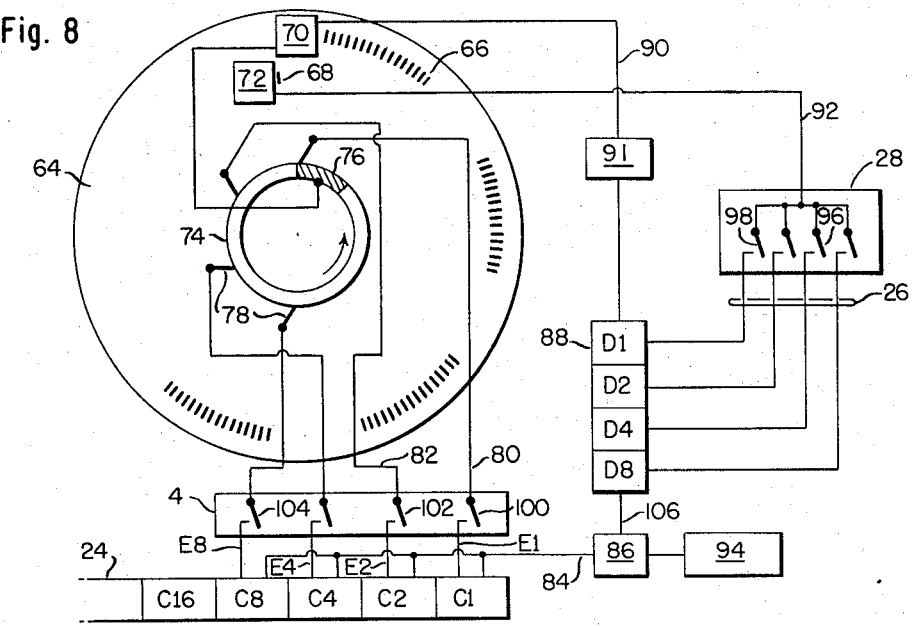
Figure 9:
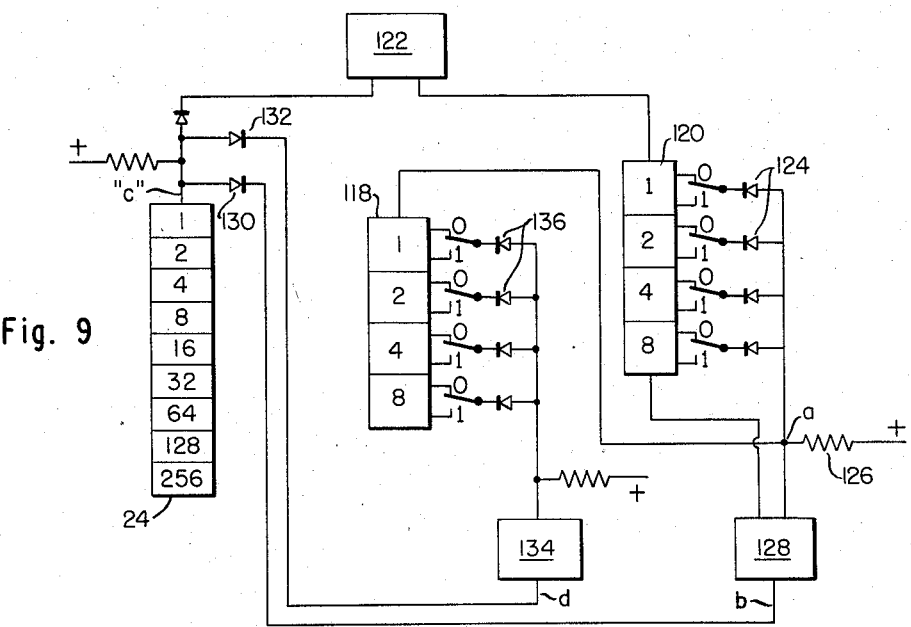
Figure 10:
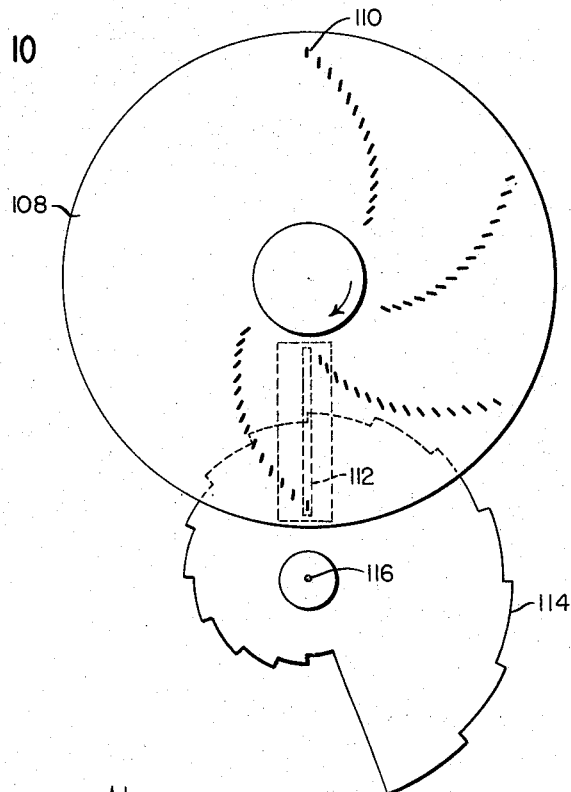
Figure 11:
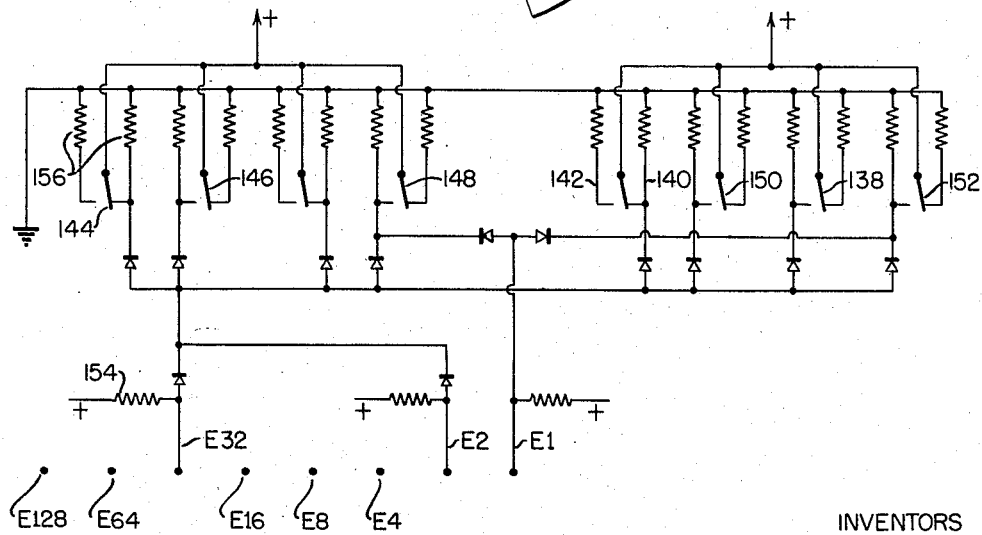

In the drawings, Fig. 1 is a block diagram of a photographic composing apparatus incorporating the invention; Fig. 2 is a diagram showing certain mathematical and functional relationships; Figs. 3 and 4 are circuit diagrams of an embodiment of the multiplier using relays as dynamic elements; Figs. 5 and 6 are circuit diagrams of a second relay embodiment of the multiplier; Fig. 7 is a diagram of an accumulator in combination with an embodiment of the multiplier which is particularly suitable where the stages of the accumulator incorporate electronic means as dynamic elements; Fig. 8 is an embodiment of the multiplier incorporating photoelectric means; Fig. 9 is an embodiment of the multiplier adapted for use with an impulse generator; Fig. 10 is a view of an alternative of the photoelectric device of Fig. 8 employing a stepped cam; and Fig. 11 is a circuit diagram of an embodiment of the multiplier exclusively composed of static elements.

Fig. 1 shows the general organization of a photographic composing machine incorporating the invention. However, the invention is not limited to the particular arrangement shown.

A keyboard 2, similar to that of a common typewriter, is provided with a set of permutation bars 4 of the type commonly used in telegraphy. The permutation bars are coupled with the keys to close electrical circuits leading to a multiplier 6, and to either a register 8 or a register 10, alternatively as shown. The registers may comprise banks of pins, eight pins for each character, the pins being selectively depressable by hammers according to a code, with sensing means for "reading" the depressed pins. The circuits comprise eight leads, to which an electrical supply voltage is applied according to a code corresponding to the selected key. A set of four leads 12 connected with the multiplier 6 is connected with the permutation bars to receive voltages according to the relative width value of the character, as represented in binary notation, whereby it is apparent that a maximum relative width value of fifteen and a minimum relative width value of zero may be represented. When one of the leads 12 is energized the corresponding binary digit is assumed to be "one," and when unenergized it is assumed to be "zero."

In this embodiment, the general procedure is first to register a whole line in the register 8, and then to register the succeeding line in the register 10 while the register 8 is connected with a reading unit 14, by means of which the stored line is transcribed in justified form. Thus, as a line of selected characters is being stored, the leads 12 and one of the registers 8 or 10 receive successive groups of impulses from the permutation bars, each group of impulses representing in binary form the relative width value of a selected character or space. In addition, the register is connected with four additional leads 16, by means of which characters of like width may be distinguished, and coded information representing a change in the point set may be stored for later use during transcription.

The keyboard 2, through the space bar, is connected with a word counter 18, by means of which a justifier 20 is supplied with the number of interword justification increments to be supplied to the particular line. Similarly, a character counter 22 supplies the justifier with information which is used where justification increments are to be inserted between each of the characters.

In order that the lines will be justified during transcription, the justifier must be supplied, during the storage of the line, with information corresponding to the cumulative total of the widths of the selected characters and minimum word spaces, by means of which the "line deficit," or additional justifying length needed, may be computed. This information is received from a line length accumulator 24. According to this invention, the accumulator 24 may be a binary counter comprising a number of stages, eight in the described embodiment, each stage being capable of reaching two states or conditions of equilibrium. Carry-over means from one stage to the next, such as are ordinarily included in counters of this type, are incorporated within the accumulator.

When a particular character is selected, a set of impulses or voltages reach the multiplier 6 over the leads 12. Voltages are also connected with the multiplier over a set of leads 26 from a coefficient selector 28, by means of which the operator may select a particular number from one to fifteen representing the beforementioned coefficient for introducing changes in the point set.

A set of eight leads E1, E2, E4, E8, E16, E32, E64 and E128, connect the multiplier 6, respectively, with each of the eight stages of the accumulator 24.

Thus, by means of the leads E1 to E128, the accumulator 24 receives successive groups of voltages or pulses, and accumulates the total of the widths of the selected characters and spaces, taking into account any changes in the point set that may have been introduced by the operator at any place in the line.

As will hereinafter appear, there are numerous ways in which voltages may be applied to the leads E1 to E128 to cause the accumulator 24 to advance its count by an amount corresponding to the product computed by the multiplier 6. For example, the voltages may appear on the leads E1 to E128 simultaneously according to the binary representation of the product, whereby each of the corresponding stages of the accumulator is switched to its other state of equilibrium (provided that it does not also receive a carry-over from a stage of lower order). If a stage was in the "one" condition, it changes to "zero" and "carries over" to the next higher order stage, and so on.

The same net result may also be produced by sending over the lead E1 a number of separate, successive pulses equal numerically to the product computed in the multiplier 6.

Another method, as will hereinafter appear in connection with Fig. 8, is to apply a group of successive pulses (equal in number to the coefficient) successively to each of a combination of the leads E1 to E8, which is selected according to the particular leads 12 to which voltages are applied by the permutation bars 4.

The invention is not directly concerned with the particular form of the accumulator 24, but as will hereinafter appear, some of the alternative forms of multiplier circuits described herein may be better adapted to one of the known forms of accumulator than to another.

Transcription of the line proceeds in successive steps, whereby each character is first projected, for example through a rotating matrix disk or drum, upon a sensitized sheet or surface carried upon a film carriage 30, and then the film carriage is moved by a space corresponding to the width of the character. At points where justification increments are to be inserted, an additional corresponding movement of the film carriage 30 is introduced without a corresponding projection.

The projection, in the embodiment of Fig. 1, is assumed to be produced by a projection unit 32, in timed relation to a continuously rotating matrix disk or drum, under the control of a decoder 34 receiving coded voltages from the reading unit 14, which senses for each character the particular pins actuated or depressed in the register.

The reading unit 14 is also connected with a multiplier 36, which may be similar to the multiplier 6, thereby supplying to it, in binary form, the relative width value of each character. At the same time, a lead 38 energizes a coefficient selector 40 according to the point set which has been selected, and the information for which has been stored in the register by means of one of the leads 16. Assuming that the multiplier 36 is of the type which represents the product in binary form upon a set of leads 42 by simultaneously appearing voltages, these leads are divided into two groups, a group 44 leading to a variable escapement 46, and a group 48 leading to a variable escapement 50. The variable escapements provide means for imparting, to shafts extending therefrom, variable amounts of angular rotation corresponding to the values represented in binary form by the voltages on the leads 44 and 48.

The variable escapement 46 is connected to a reduction gear train 52, which reduces the output motion of the escapement by a ratio of $$\frac{1}{16}$$

The outputs of the gear train 52 and of the variable escapement 50 are applied to an adder 54, which may include any of the known differential gear devices, and which adds the two motions and causes the film carriage 30 to move through a distance corresponding to their sum. A clutch 56 provides means for disengaging the adder 54 from the film carriage 30 to facilitate the carriage return when the line is completely projected, or to permit a tabulation device to be used.

The justifier 20, by means of a set of leads 58, applies voltages or pulses to the variable escapements 46 and 50 each time a justification increment, as indicated by the reading unit 14, is to be added in the line.

When variable escapements of the type described in the application Serial No. 128,162, mentioned above, are used, or any other escapement of generally similar operation, it will be obvious that certain mechanical limitations are imposed with regard to the number of different stops or movements that may be produced. These limitations assume serious proportions where a large number of stops is desired. For example, in the apparatus of Fig. 1 it is assumed that the carriage may be moved any number of units between the values 1 and 225, the latter representing the product of 15×15. A single variable escapement mechanism having 225 different stops would be at best an intricate, expensive and cumbersome device. By the means described above, the desired result is obtained, however, by using two variable escapements, each of which is provided with only fifteen different stops. Construction is thus greatly simplified.

Having thus described the general organization of a photographic composing apparatus according to the invention, we next describe a series of different embodiments of the multiplier unit.

Figs. 3 and 4 comprise a circuit diagram of an embodiment of the multiplier 6 having sixteen relays R1 to R16. The operation may be described with reference to Fig. 2. The leads 12 and 26, representing respectively the relative width value and the coefficient, are represented schematically by blocks showing the binary orders of the respective leads. The horizontal dotted lines communicate with the leads 26, while the diagonal dotted lines communicate with the leads 12. Assuming that a given character has a relative width value of 5 and a point set, or coefficient, of 11, the circles appearing at the intersections of the dotted lines communicating with the energized leads are indicated in black. The values to be represented on the leads E1 to E128 are found by binary addition of the vertical columns of black circles. Thus, starting at the right, a voltage appears on each of the leads E1, E2 and E4. The lead E8 remains unenergized, while sending a carry-over to the lead E16. The lead E32 also receives a voltage. It may readily be verified that the number indicated by the energized leads E1 to E128 is "55" that is, 32+16+4+2+1.

Referring to Fig. 3, the particular "partial product" relays R1 to R16 to be energized by the permutation bars 4 and coefficient selector 28 are determined in the same manner as the black circles of Fig. 2. Thus, in the indicated example, by closure of the appropriate switch contacts the relays R2, R4, R6, R8, R14 and R16 are energized.

It may be readily verified from Fig. 4 that voltages will then be applied to the same leads E1 to E128, connected with the accumulator 24, as are indicated diagrammatically in Fig. 2. In Fig. 4, each column of transfer relay contacts bears, at the head of the column, a numerical designation, and corresponds with the relay bearing the same arabic numeral. Thus, the two columns of contacts headed r12 belong to the relay R12. All relay contacts are shown in Fig. 4 in the positions reached when the corresponding relays are unenergized.

It is obvious from the above that the multiplier of Figs. 3 and 4 is of the type which produces voltages simultaneously on the respective leads E1 to E128 representing in binary form the desired product. A binary counter suitable for receiving successive groups of voltages in this form is described in the copending application, Serial No. 70,472, mentioned above. However, other suitable counters may suggest themselves to those skilled in this art from the above description.

Another embodiment of the multiplier, employing eight relays instead of sixteen, is shown in Figs. 5 and 6. Referring to Fig. 5, the permutation bars 4 are connected with four relays A1, A2, A4 and A8, and the coefficient selector 28 is connected with four relays B1, B2, B4 and B8. The contacts of these relays are shown in Fig. 6. The contacts of Fig. 6 are designated by arabic numerals corresponding to the numerals of the associated relays, and lower case letters corresponding to the letters of the associated relays. Thus, the contacts designated "a1" belong to the relay A1, for example.

To illustrate the operation of this embodiment it may be assumed, as with the previous embodiment, that the relative width value of the character is "5" and the point set is "11." Thus, the relays A1, A4, B1, B2 and B8 are energized. It may be readily verified from Fig. 6 that the same leads E1 to E128 are energized as in the embodiment of Fig. 4.

The embodiments of the multiplier heretofore described are of the type that send simultaneous signals to one or several stages of the accumulator. Since the stages are actuated simultaneously, the time consumed by the process of accumulating each new product in the accumulator may be extremely short even though the stages of the counter are relatively slow-acting, such as for example relay flip-flop circuits.

The embodiment of the multiplier shown in Fig. 7 is of the type that sends a number of impulses over the leads E1 to E64 in succession, rather than simultaneously. For this reason, it may be found that the total time necessary to send a product into the accumulator can be shortened sufficiently only by employing relatively fast-acting stages in the accumulator. In such a case any of the well-known electronic binary counters requiring only extremely brief actuating impulses can be used, and the total elapsed time for transmitting the entire product can be reduced to within the limits defined by the typing speed of the machine operator, or the rate of transcription, as the case may be.

As in the embodiment of Figs. 5 and 6, the embodiment of Fig. 7 requires eight input relays, A'1 to A'8 and B'1 to B'8. The contacts for the relays, following the same convention as Fig. 6, are arranged in pairs in the positions corresponding to the unactuated conditions of their respective relays. The stages of the counter-accumulator are labeled C1, C2, C4, . . . C128. The rectifiers connecting each pair of stages represent the circuits over which carry-over impulses are sent from each stage to the stage of next higher order.

The operation of this device may be seen by taking the foregoing example, relative width value "5" and point set, or coefficient, "11." The relays A'1, A'4, B'1, B'2, and B'8 are energized. A distributor 62, which may be, for example a rotary switch adapted to connect a voltage successively to each of sixteen leads, starting at the top of the figure, then finds circuits through certain pairs of the relay contacts to the various stages of the counter. The first impulse passes through the contacts a'1, b'1 to the counter stage C1. The next impulse passes through the contacts a'1, b'2; the next through the contacts a'4, b'1; and so on. It will be noted that two impulses arrive successively at the counter stage C8, one passing through the contacts a'4, b'2, and a second through the contacts a'1, b'8.

It may be readily verified that the net effect on the accumulator is to advance it by an amount equal to the product "55," as in the former embodiments.

It will be obvious that the distributor 62 may assume any of a variety of known forms, some not involving moving parts. Many known devices of this type may reach speeds of the order of 10,000 impulses per second or greater. At this rate, it would take only 1.6 milliseconds or less to transfer the entire product to the accumulator.

The embodiment of Fig. 8 includes a continuously rotating, opaque disk 64, having disposed thereon four groups of translucent apertures or slits 66, there being sixteen slits in each group. A single slit 68 is disposed relative to the other slits at a different radius, as shown in the drawing. A photoelectric device 70 is provided with means for producing impulses corresponding to the passage of each of the slits 66 past a fixed position. A photoelectric device 72 similarly produces an impulse corresponding to the passage of the slit 68 in front of its sensitive element. The disk 64 is assumed to rotate in the direction indicated by the arrow. The arrangement of the photoelectric devices is such that the slit 68 generates an impulse prior to the first impulse generated by one of the slits 66.

A slip ring 74 made of insulating material and having a single conducting segment 76, is secured to and rotates with the disk. The segment 76 is connected electrically with the photoelectric device 70 to receive the impulses therefrom.

Four brushes 78 are distributed around the slip ring in such a way that each one of the brushes, upon coming in contact with the segment 76, remains in contact while a complete group of sixteen impulses is generated by the slits 66.

The disk 64 is preferably geared with cams or similar devices which are used for timing the various operations occurring during the transcription process heretofore described. The process of multiplying a relative width value by a coefficient requires one revolution of the disk 64, starting from the position indicated in the drawing. Thus, after the generation of an impulse by the slit 68, a group of sixteen impulses reaches one of the brushes 78 through the segment 76; then, a succeeding group of sixteen impulses reaches the next brush 78 in a similar manner; and so on.

Four leads, such as 80 and 82, are connected with switches shown as being included within the block which contains the permutation bars 4. These switches are assumed to be closed according to the binary representation of the relative width value of the selected character. (It will be apparent, of course, that if the multiplier is used in connection with transcription these four switches would represent contacts closed according to the combination of pins "sensed" by the reading unit 14 of the register.) The impulses transmitted through the closed switch contacts are transmitted, respectively, to each of the stages C1, C2, C4 and C8 of the accumulator 24. However, a voltage may be applied by means of a lead 84, connected from a flip-flop device 86 to the stages C1 to C8, to cause them to be unaffected by any impulses appearing on their input leads E1 to E8. This "desensitizing" voltage appears on the lead 84 when the device 86 is in one of its two stable states, but not in the other.

An auxiliary binary counter 88 comprising binary stages D1 to D8 is connected with the photoelectric device 70 by a lead 90 and a delay device 91, which transmits impulses, delayed by a few microseconds, to the lowest order stage of the counter.

Impulses generated by the device 72 may be transmitted to any one or more of the stages of the counter over a lead 92, which is connected with the stages through contacts in the coefficient selector 28.

The operation may be described with reference to the case of a character with a relative width value of "11" and a coefficient of "5." First, an impulse from a timing device 94, synchronized with the disk 64, is transmitted to the flip-flop device 86 to bring this device to the condition in which the lead 84 carries a voltage which "desensitizes" the accumulator stages C1 to C8.

Next, an impulse generated by the slit 68 passes over the lead 92 and through a pair of contacts 96 and 98 to the stages D1 and D4 of the counter 88. This causes the counter to read the coefficient, "5."

Next, the device 70 sends a group of sixteen delayed impulses to the D1 stage of the counter 88, and sixteen undelayed impulses through the segment 76, the lead 80, and a contact 100 to the C1 stage of the accumulator 24. The contact 100 and two other contacts 102 and 104 are assumed to be closed to represent the relative width value, "11."

The first ten impulses passing over the lead 80 have no effect upon the stage C1, since the accumulator stages are assumed to be desensitized by the voltage on the lead 84. These ten impulses "fill-up" the counter 88, bringing it from its initial setting of "5" to its maximum capacity of "15."

The eleventh impulse reaching the counter 88 causes the D8 stage of the counter 88 to send a "carry-over" impulse over a lead 106 to the flip-flop device 86, thereby removing the "desensitizing" voltage from the lead 84. Because of the delay device 91, this eleventh impulse from the photoelectric device 70 reaches the C1 stage of the accumulator through the contact 100 before this change has occurred, whereby this impulse also has no effect on the accumulator.

The next five impulses, which advance the accumulator 24, also advance the counter 88 to its original value of "5," which is the position originally preset therein by the device 72.

Next, prior to the generation of the next group of impulses in the device 70, the device 94 sends an impulse into the flip-flop device 86 to re-apply the desensitizing voltage to the lead 84.

The procedure then repeats itself, with the same group of five impulses reaching the C2 stage of the accumulator through the contacts 102.

The succeeding group of fifteen impulses fails to reach the counter stage C4, since the associated contacts are assumed to be open.

Finally, a group of five impulses reaches the C8 stage. The net effect is to cause the accumulator 24 to advance by a count equal to $5 \times 8 + 5 \times 2 + 5 \times 1 = 55$.

An alternative method of generating the successive groups of impulses is shown in Fig. 10. A disk 108, covered with an opaque material or coating, is provided with four groups of translucent slits 110, in an arrangement whereby only one slit at a time passes in front of a fixed aperture 112, and each slit in the group is at a different radius. A stepped cam 114, rotatable about a fixed axis 116, provides means for selectively blocking out a portion of the aperture 112.

The cam 114 has a number of steps corresponding, for example, to the desired point set, or coefficient. Thus, if the cam is set for a point set of "5," only five slits in each group will cause light impulses, and the result is four successive groups of impulses, with five successive impulses in each group.

A distributing arrangement such as that described in reference to Fig. 8 may be used to apply these impulses successively to the selected stages of the accumulator 24.

Fig. 9 shows an embodiment in which electronic tubes are used, and in which a number of trains of impulses are sent into the counter-accumulator 24. This counter may be of the type comprising a succession of flip-flop stages of the Eccles-Jordan type. Two other binary counters 118 and 120 of the same type are associated, respectively, with the permutation bars 4 and the coefficient selector 28. A set of transfer contacts is connected with each of the stages of the counters 118 and 120, and each contact set corresponds with one of the leads 12 or 26 (Fig. 1) as the case may be. When the contacts are in the positions shown, the corresponding leads are assumed to be deenergized; when in the "1" positions, the corresponding leads are assumed to be energized.

An impulse generator 122 supplies impulses to the counters 120 and 24 at a frequency of, for example, 100,000 impulses per second. Each stage of the counter 120 has two conditions of rest. When the stage counts a "zero" a high potential is applied to its terminal "zero," and a low potential to its terminal "1"; when the stage counts a "1" a high potential is applied to its terminal "1" and a low potential to its terminal "zero."

Using the example of a character having a relative width value of "5," and a point set or coefficient of "11," the contacts connected to the stages "1," "2" and "8" of the counter 120, and the contacts connected to the stages "1" and "4" of the counter 118, are moved to their "1" positions. When positive impulses are sent into the counter 120 by the impulse generator 122 the potentials on the terminals "zero" and "1" of its various stages assume in succession the corresponding binary combinations.

For the assumed case it may be seen that the potentials applied to unidirectional elements 124, which may be germanium crystals, for example, are all "high" for the eleventh impulse. At this moment the potential at a point "a" rises. In all other positions of the counter 120 there is at least one rectifier 124 connected to a low potential, which results in a corresponding voltage drop in a resistance 126, so that the signal is kept at a lower level.

The eleventh impulse is in this way transmitted to the input of a flip-flop circuit 128 which reverses the potential of its output lead "b" from "high" to "low." This reversal blocks the input of the counter-accumulator 24, since a rectifier 130 connected to its input terminal "c" is now connected to a low potential. Another rectifier 132, connected to a flip-flop circuit 134, is at a high potential as will be seen later. Thus, the first eleven impulses reach the counter 24 before the circuit 128 reverses its potential.

The following impulses, up to the sixteenth, do not actuate the counter 24, but the sixteenth impulse, which resets the counter 120 to "zero," is transmitted by a carry-over to the circuit 128, which changes the potential at the point "b" to "high."

The second train of eleven impulses, starting with the seventeenth, is allowed to reach the counter 24 in a similar manner.

The number of trains of impulses thus sent to the counter 24 is controlled by the counter 118. To this effect, the eleventh impulse, sent to the flip-flop circuit 128, is also sent to the counter 118. In the above example the contacts connected to the "1" and "4" stages of this counter are assumed to be in their "1" positions. It follows that after the fifth such impulse received by the counter 118 all of the unidirectional elements 136 are connected to high potentials, and a high voltage is then transmitted to the flip-flop circuit 134. This circuit changes the potential at its output terminal "d" from "high" to "low." It follows that no other impulse from the generator 122 can advance the counter 24. The multiplication operation is then completed, the counter 24 having received five trains of eleven impulses each, causing it to count "55."

The description has been given on the assumption that the impulses are of positive polarity. In the case of pulses of negative polarity connections may be reversed in a manner well known in the art.

According to the embodiment of the multiplier shown in Fig. 11 the multiplication is effected without any moving parts. The product of the relative width value of the character and the coefficient is obtained by means of static elements which are unidirectional, such as rectifiers, vacuum tubes, or similar devices.

A set of contacts such as 138, controlled according to the coefficient in a manner similar to the contacts associated with the counter 120 in Fig. 9, connect a battery to a set of wires such as 140 when the contacts are in the positions shown (representing "zero"), and to a set of wires such as 142 when in the other positions (representing "1").

A set of contacts such as 144 is operated in a similar manner according to the relative width value of the character.

In the case of a character having a relative width value of "5" and a coefficient of "7," a group of contacts 146, 148, 150, 138 and 152 are operated and the battery is connected through a set of rectifiers to each of the wires E1, E2 and E32, representing the product, "35."

The wires E1 to E128 are each connected through resistances such as 154 to the battery. Resistances 156, associated with the contacts, are of low value relative to the resistances such as 154. Therefore, the voltage on a lead such as E32 is reduced by a potential drop across the resistance 154 whenever there is a current path from the lead E32 through a rectifier to ground through one of the resistances such as 156. In other words, if all of the contacts were not in the positions assumed in the example, there would be a low resistance path to ground through one or more of the resistances 156, and the potential of the lead E32 would remain close to ground, even though one or more of the other rectifiers connected to the lead E32 were connected with the battery through one of the switches. It is assumed, of course, that the external load connected to the leads E1 to E128 is of relatively high impedance, compared with that of the resistance 154.

The case of the lead E1 is special, since this lead must be excited whenever the multiplier and multiplicand are both odd figures. A circuit with only two rectifiers, as shown, is therefore sufficient.

Similar circuits must be provided for all possible products. The result is a circuit comprising a relatively large number of rectifiers, but these may be of very small dimensions, and the circuit may be designed to operate with very low current intensities. Printed circuits can be used with advantage in this embodiment.

While the invention has been described with reference to the particular structures and arrangements shown in the drawings, it is not limited thereto in every particular, and numerous adaptations and variations thereof falling within the scope of the invention will suggest themselves to those skilled in this art.

Having thus described the invention, we claim:

1. In type composing apparatus, the combination of means to select successively the characters and spaces in a line of type, means operable by said selective means to represent the relative width value of each selected character and space, means operable independently of said relative width value representing means to represent a coefficient corresponding to the selected point set of each selected character and space, a multiplier operable by said relative width value and point set representing means to produce successively the products of the values represented thereby, a register associated with said selective means to store information corresponding to said selected characters and spaces and their corresponding coefficients, a line length accumulator operable by said multiplier to add said products, means for determining the difference between the total of said products and a predetermined justified line length, a justifier to compute the sizes of increment spaces equal in total to said difference, transcribing means operable by the register to form the selected characters successively upon a sheet, and spacing mechanism operable by the register to space the characters on said sheet by a distance proportional to said products, and operable by the justifier to insert spaces proportional to said increments.

2. In type composing apparatus, the combination of a keyboard for selecting successively the characters and spaces in a line of type, means operable by said keyboard to represent the relative width value of each selected character and space, means operable independently of said relative width value representing means to represent a coefficient corresponding to the selected point set of each selected character and space, a multiplier operable by said relative width value and point set representing means to produce successively the products of the values represented thereby, a register associated with the keyboard to store information corresponding to said selected characters and spaces and their corresponding coefficients, a line length accumulator operable by said multiplier to add said products, means for determining the difference between the total of said products and a predetermined justified line length, a justifier to compute the sizes of increment spaces equal in total to said difference, transcribing means operable by the register to form the selected characters successively upon a sheet, and spacing mechanism operable by the register to space the characters on said sheet by a distance proportional to said products, and operable by the justifier to insert spaces proportional to said increments.

3. In type composing apparatus, the combination of means to select successively the characters and spaces in a line of type, means operable by said selective means to represent numerically the relative width value of each selected character and space, means operable independently of said relative width value representing means to represent numerically a coefficient corresponding to the selected point set of each selected character and space, a digital multiplier operable by said relative width value and point set representing means to produce successively the products of the values represented thereby, a register associated with said selective means to store information corresponding to said selected characters and spaces and their corresponding coefficients, a line length accumulator operable by said multiplier to add said products, means for determining the difference between the total of said products and a predetermined justified line length, a justifier to compute the sizes of increment spaces equal in total to said difference, transcribing means operable by the register to form the selected characters successively upon a sheet, and spacing mechanism operable by the register to space the characters on said sheet by a distance proportional to said products, and operable by the justifier to insert spaces proportional to said increments.

References Cited in the file of this patent
UNITED STATES PATENTS

| | | |
|---|---|---|
| 2,318,591 | Couffignal | May 11, 1943 |
| 2,394,924 | Luhn | Feb. 12, 1946 |
| 2,484,649 | Root | Oct. 11, 1949 |
| 2,521,418 | Sens-Olive | Sept. 5, 1950 |
| 2,590,599 | Evans | Mar. 25, 1952 |
| 2,604,262 | Phelps | July 22, 1952 |
| 2,623,115 | Woods-Hill | Dec. 23, 1952 |
| 2,701,991 | Croucher | Feb. 15, 1955 |